(12) United States Patent
Chung et al.

(10) Patent No.: US 7,475,861 B2
(45) Date of Patent: Jan. 13, 2009

(54) SEAT RAIL FOR VEHICLES

(75) Inventors: Jae Ho Chung, Seoul (KR); Jin Sik Kim, Kyoung-Gi-Do (KR)

(73) Assignee: Dymos Inc., Seosan, Chungnam (KR)

( * ) Notice: Subject to any disclaimer, the term of this patent is extended or adjusted under 35 U.S.C. 154(b) by 0 days.

(21) Appl. No.: 11/545,911

(22) Filed: Oct. 11, 2006

(65) Prior Publication Data
US 2007/0181769 A1   Aug. 9, 2007

(30) Foreign Application Priority Data
Feb. 8, 2006   (KR) .................. 10-2006-0012191

(51) Int. Cl.
*F16M 13/00*   (2006.01)
(52) U.S. Cl. ...................... 248/429; 248/430
(58) Field of Classification Search .............. 248/424, 248/429, 430; 297/216.1, 216.16, 344.1, 297/340
See application file for complete search history.

(56) References Cited

U.S. PATENT DOCUMENTS

| | | | | |
|---|---|---|---|---|
| 4,809,939 A | * | 3/1989 | Matsushima et al. ........ | 248/430 |
| 5,020,853 A | * | 6/1991 | Babbs ......................... | 297/341 |
| 5,447,352 A | * | 9/1995 | Ito et al. .................... | 296/65.14 |
| 5,848,775 A | * | 12/1998 | Isomura et al. .............. | 248/430 |
| 6,116,561 A | * | 9/2000 | Christopher ................. | 248/429 |
| 6,422,526 B1 | * | 7/2002 | Ishikawa et al. ............. | 248/430 |
| 6,427,962 B1 | * | 8/2002 | Rohee et al. ................. | 248/424 |
| 6,497,397 B2 | * | 12/2002 | Fujimoto et al. ............. | 248/430 |
| 6,557,809 B2 | * | 5/2003 | Downey ...................... | 248/430 |
| 2002/0008183 A1 | * | 1/2002 | Mallard et al. ............... | 248/429 |
| 2004/0056165 A1 | * | 3/2004 | Ganot ......................... | 248/430 |

* cited by examiner

*Primary Examiner*—Korie Chan
(74) *Attorney, Agent, or Firm*—Merchant & Gould P.C.

(57) ABSTRACT

Disclosed herein is a seat rail for vehicles. The seat rail of this invention eliminates gaps between a lower track and an upper track in horizontal and vertical directions, and distributes a load transmitted through the upper track, thus improving overall durability. The invention reduces the number of parts required, thus reducing the cost of a product and the working hours, realizing a light product, reducing fuel consumption, improving operational performance, reducing operational noise, and improving operating sensation. Further, the invention secures strength sufficient to support bending moment of the upper track, which is a concern during a head-on collision or a rear-end collision, thus maximizing the safety of passengers.

4 Claims, 6 Drawing Sheets

SEAT RAIL FOR VEHICLES

FIELD OF THE INVENTION

The present invention relates to a seat rail for vehicles.

BACKGROUND OF THE INVENTION

Generally, a seat is mounted to a vehicle in such a way as to slide forwards and backwards relative to a vehicle body, thus affording good riding comfort. To this end, a seat rail is provided, thus allowing the seat to slide.

In the case of a car having two rows of seats, a short rail is installed in the car and is used to move the driver's seat and the seat next to the driver's seat. Meanwhile, in the case of an SUV having two or more rows of seats, first and second rows of seats are usually fitted with short rails and the third row of seats and beyond are fitted with long rails to move seats.

In this case, the seat rail is constructed so that an upper track coupled to a seat cushion frame is slidably movable along a lower track mounted to the floor panel in the longitudinal direction of a vehicle body. Further, the seat rail includes a lock unit to restrict the motion of the upper track.

Such a seat rail must be constructed so as to satisfactorily bear the load of a passenger and so that the upper track smoothly slides along the lower track. Preferably, the seat rail is light so as to help reduce fuel consumption.

Further, in order to effectively ensure the safety of passengers, the seat rail must be constructed to provide sufficient strength to bear bending moment of the upper track, which occurs during a head-on collision or a rear-end collision.

SUMMARY OF THE INVENTION

The present invention provides a seat rail for vehicles, which sufficiently bears the load of a passenger, allows an upper track to smoothly slide along a lower track, and reduces the number of parts required, thus reducing the cost of a product, realizing a light product, reducing noise generated during operation, improving operating sensation, and reducing fuel consumption, and which is strong enough to bear bending moment of the upper track, which occurs during a head-on collision or a rear-end collision, thus maximally protecting the safety of the passenger.

A seat rail for vehicles according to the present invention, including a lower track, an upper track, a left bearing seat, a right bearing seat, a plurality of ball bearings, and a plurality of roller members. The lower track is mounted to a floor panel in a longitudinal direction of a vehicle body, and both ends of the lower track are bent in such a way as to have a bilaterally symmetrical structure, thus defining a rail groove in the lower track. The upper track comprises an assembly of an inner panel with an outer panel. Overlapping first ends of the inner and outer panels are coupled to a seat cushion frame, and second ends of the inner and outer panels are bifurcated from each other and bent to be fitted into both ends of the rail groove. The left bearing seat is defined by an end of an outer panel located in the rail groove and a portion of the lower track facing the end of the outer panel to have a shape of symmetrical arcs. The right bearing seat is defined by an end of an inner panel located in the rail groove and a portion of the lower track facing the end of the inner panel to have a shape of symmetrical arcs. The ball bearings are seated in the left and right bearing seats and installed to be in point contact with the lower track and the inner panel, and to be in point contact with the lower track and the outer panel. The roller members are interposed between a bottom of the lower track defining the rail groove and a bottom of the inner panel facing the bottom of the lower track, and between the bottom of the lower track and a bottom of the outer panel facing the bottom of the lower track, and come into point contact with the bottoms.

BRIEF DESCRIPTION OF THE DRAWINGS

For a better understanding of the nature and objects of the present invention, reference should be made to the following detailed description with the accompanying drawings, in which.

DESCRIPTION OF THE PREFERRED EMBODIMENTS

Figure 1:
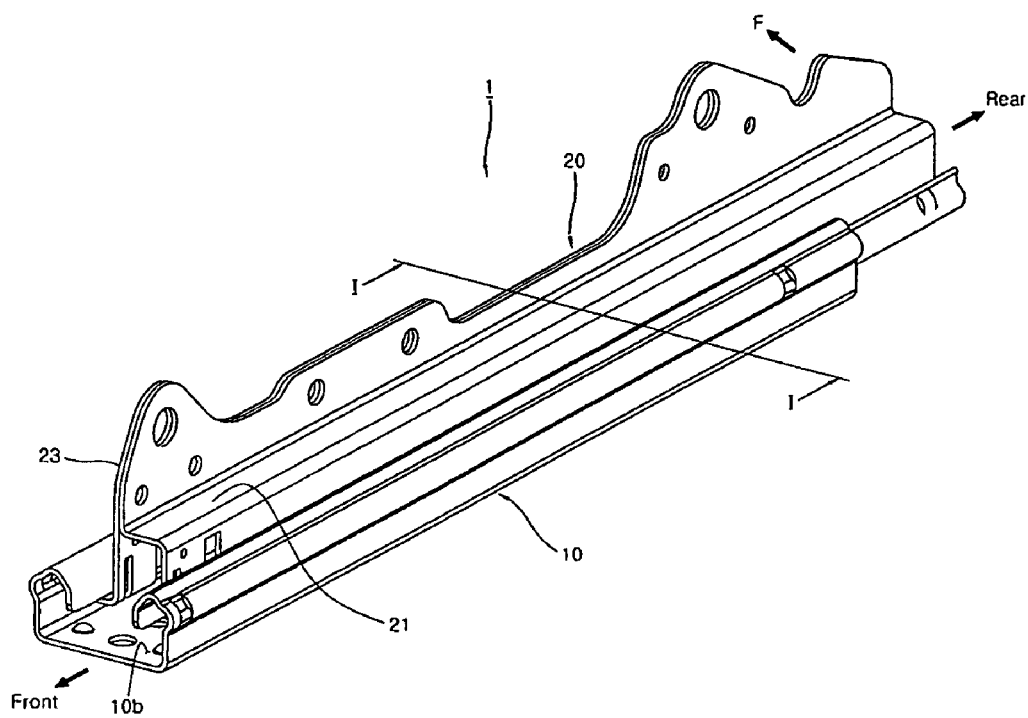
FIG. 1 is a perspective view showing a seat rail for vehicles, according to the present invention.
Figure 2:
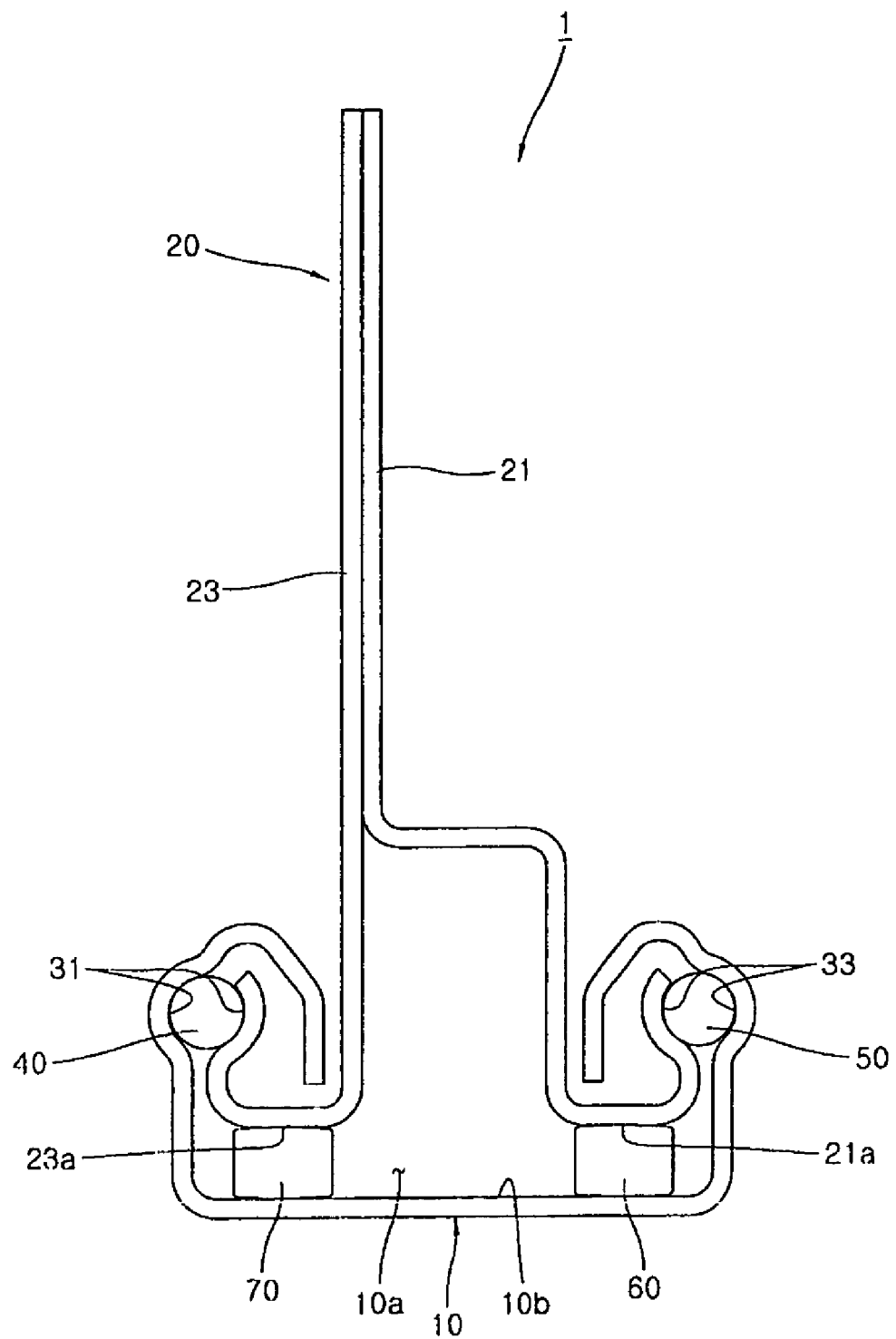
FIG. 2 is a sectional view taken along line I-I of FIG. 1.

As shown in FIGS. 1 and 2, the seat rail 1 according to this invention includes a lower track 10 and an upper track 20. The lower track 10 is mounted to the floor panel in the longitudinal direction of a vehicle body. Both ends of the lower track 10 are bent in such a way as to realize a bilaterally symmetrical structure, thus defining a rail groove 10a in the lower track 10. One end (upper end) of the upper track 20 is coupled to a seat cushion frame, and the other end (lower end) of the upper track 20 is bifurcated into two parts, the parts being fitted into two respective ends of the rail groove 10a. Thereby, the upper track 20 is installed to reciprocate along the rail groove 10a.

In this case, the upper track 20 comprises an assembly of an inner panel 21 with an outer panel 23. The inner panel 21 overlaps the outer panel 23 such that upper ends thereof are in surface contact with each other, and are integrally coupled to the seat cushion frame (not shown) via a fastening member. The lower end of the upper track 20 is bifurcated into two parts, so that the two parts are bent and are fitted into both ends of the rail groove 10a.

Further, the seat rail 1 of this invention includes a left bearing seat 31, a right bearing seat 33, a plurality of ball bearings 40 and 50, and a plurality of roller members 60 and 70. The left bearing seat 31 is defined by the end of the outer panel 23 located in the rail groove 10a and a portion of the lower track 10 facing the end of the outer panel 23 to have the shape of symmetrical arcs. The right bearing seat 33 is defined by the end of the inner panel 21 located in the rail groove 10a and a portion of the lower track 10 facing the end of the inner panel 21 to have the shape of symmetrical arcs. The ball bearing 40 is seated in the left bearing seat 31 and is in point contact with the lower track 20 and the outer panel 23, and the ball bearing 50 is seated in the right bearing seat 33 and is in point contact with the lower track 10 and the inner panel 21. The roller member 60 is interposed between the bottom 10b of the lower track 10 defining the rail groove 10a and the bottom 21a of the inner panel 21 facing the bottom 10b to be in point contact with the bottoms 10b and 21a. The roller member 70 is interposed between the bottom 10b of the lower track 10 and the bottom 23a of the outer panel 23 facing the bottom 10b to be in point contact with the bottoms 10b and 23a.

Further, the seat rail 1 of this invention includes a lock unit (not shown), which restricts the motion of the upper track 20.

Figure 3:
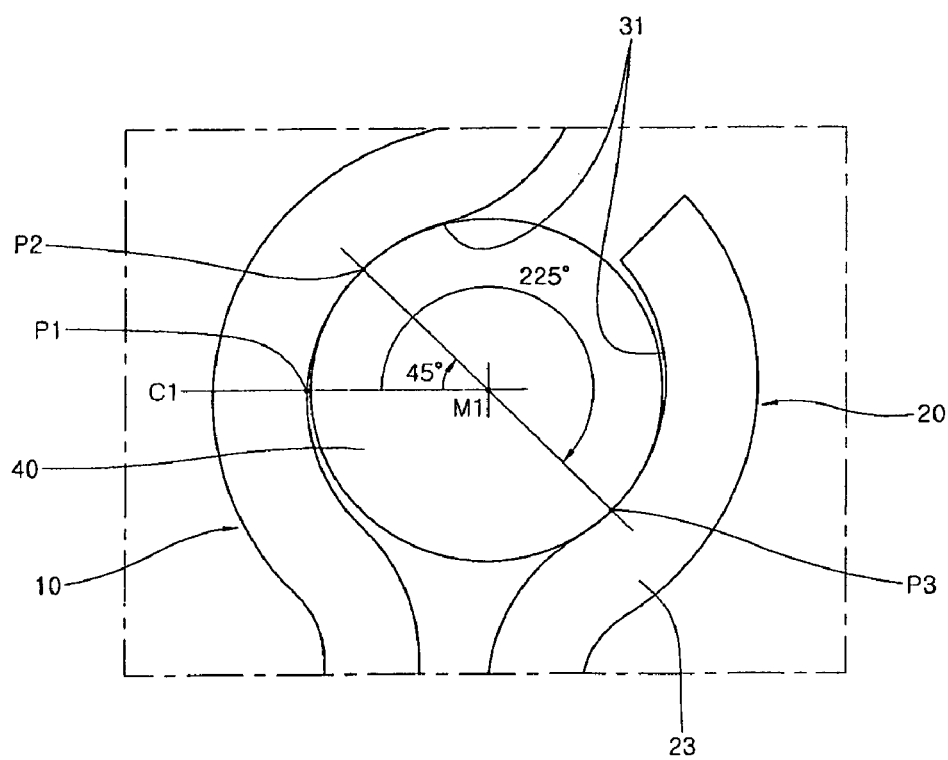
FIG. 3 is a sectional view illustrating a ball bearing installed in a left bearing seat of the seat rail, according to the present invention.

In this case, as shown in FIG. 3, when the point where the horizontal line C1 passing through the center of gravity M1 of the ball bearing 40 seated in the left bearing seat 31 meets the lower track is set as a reference point P1, the ball bearing 40 is seated in the left bearing seat 31 such that the point P2 of the ball bearing 40 rotated clockwise from the reference point P1 by 45° contacts the lower track 10, and the point P3 of the ball bearing 40 rotated clockwise from the reference point P1 by 225° contacts the outer panel 23.

Figure 4:
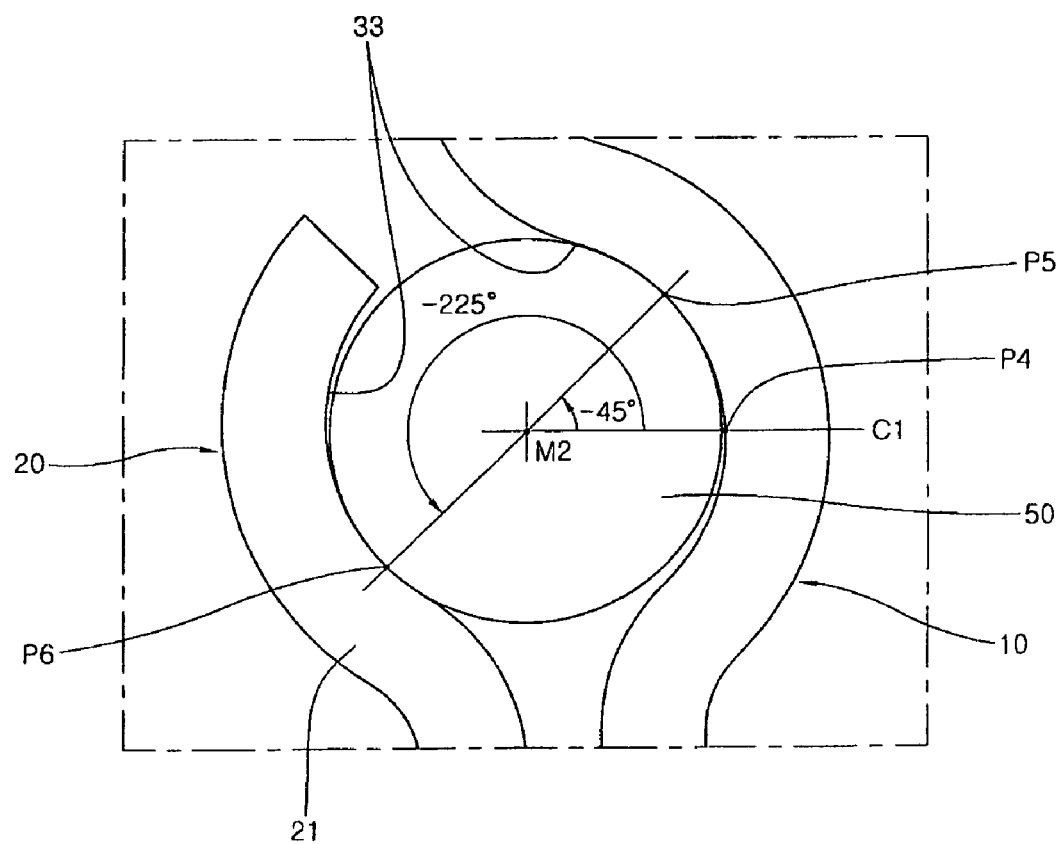
FIG. 4 is a sectional view illustrating a ball bearing installed in a right bearing seat of the seat rail, according to the present invention.

Meanwhile, the ball bearing 50 is installed in the right bearing seat 33, as shown in FIG. 4. That is, when the point where the horizontal line C1 passing through the center of gravity M2 of the ball bearing 50 meets the lower track 10 is set as a reference point P4, the ball bearing 50 is seated in the right bearing seat 33 such that the point P5 of the ball bearing rotated counterclockwise from the reference point P4 by 45° contacts the lower track 10, and the point P6 of the ball bearing rotated counterclockwise from the reference point P4 by 225° contacts the inner panel 21.

Figure 5:
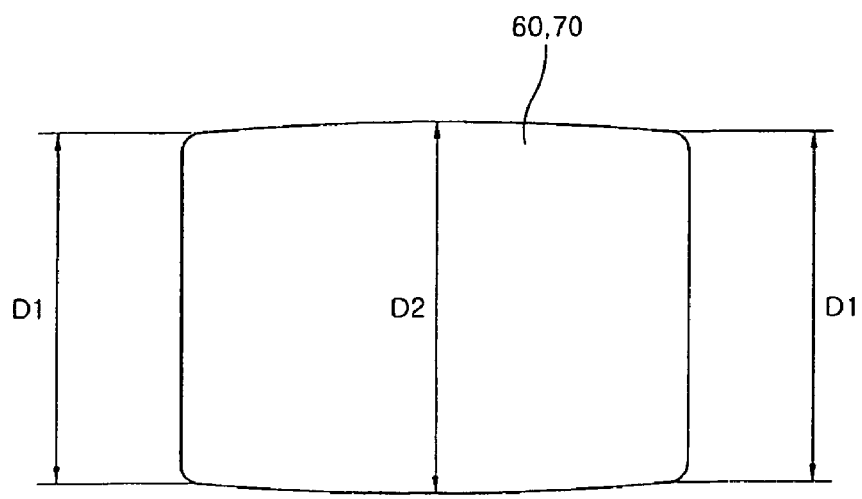
FIG. 5 is a front view illustrating roller members of the seat rail, according to the present invention.

Meanwhile, the roller members 60 and 70 are bulging-shaped roller members. As shown in FIG. 5, each of the roller members 60 and 70 is shaped such that the two ends D1 thereof have the same diameter and such that the diameter gradually increases moving from either end to a central portion D2.

Figure 6:
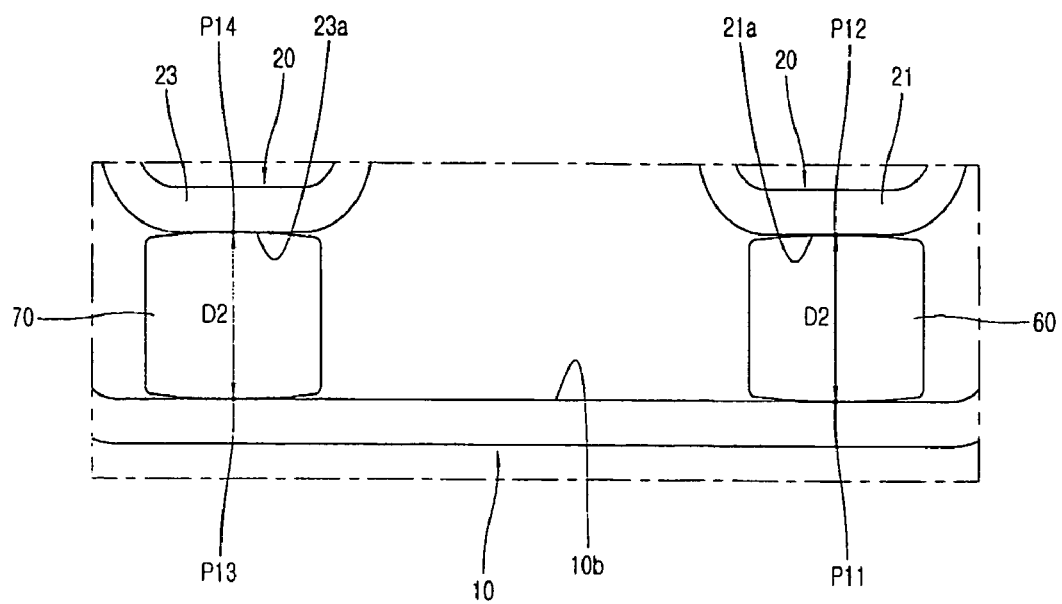
FIG. 6 is a sectional view illustrating the state in which the roller members according to the present invention are installed between a lower track and an upper track.

When the roller member 60 having such a shape is interposed between the bottom 10b of the lower track 10 and the bottom 21a of the inner panel 21, the circumferential surface of the central portion D2 of the roller member 60 is simultaneously in contact with a point P11 on the bottom 10b of the lower track 10, and with a point P12 on the bottom 21a of the inner panel 21, as shown in FIG. 6.

Further, when the roller member 70 according to this invention is interposed between the bottom 10b of the lower track 10 and the bottom 23a of the outer panel 23, the circumferential surface of the central portion D2 of the roller member 70 is simultaneously in contact with a point P13 on the bottom 10b of the lower track 10, and with a point P14 on the bottom 23a of the outer panel 23, as shown in FIG. 6.

Hereinafter, the operation and effect of the seat rail according to the present invention will be described.

According to this invention, the upper track 20 of the seat rail 1 smoothly slides due to the rolling motion of the ball bearings 40 and 50 and the roller members 60 and 70.

Further, the ball bearings 40 and 50, seated, respectively, in the left and right bearing seats 31 and 33, prevent gaps from being formed in the horizontal direction between the lower track 10 and the upper track 20.

Further, the seat rail 1 of this invention prevents gaps from being formed in the vertical direction between the lower track 10 and the upper track 20 by the roller member 60 installed between the lower track 10 and the inner panel 21 and the roller member 70 installed between the lower track 10 and the outer panel 23.

In the seat rail 1 of this invention, the upper ends of the inner panel 21 and the outer panel 23 constituting the upper track 20 are directly coupled to the seat cushion frame via the fastening member. Conversely, in the case of a conventional seat rail, an additional coupling member is coupled to the upper track, and the coupling member is coupled to a seat cushion frame. Thus, the number of required parts is reduced in comparison with the conventional seat rail. Thereby, the manufacturing cost and the working hours are reduced, and additionally a light product is achieved and fuel consumption is reduced.

According to the present invention, the roller member 60 is installed such that the central portion D2 thereof is in point contact with the bottom 10b of the lower track 10 and the bottom 21a of the inner panel 21, and the roller member 70 is installed such that the central portion D2 thereof is in point contact with the bottom 10b of the lower track 10 and the bottom 23a of the outer panel 23. Such a construction minimizes a frictional area when the upper track 20 slides, thus improving operational performance, reducing operational noise, and improving operating sensation.

Further, according to the present invention, the load transmitted through the upper track 20 is distributed and supported by the roller members 60 and 70 and the ball bearings 40 and 50. The load concentrated on the roller members 60 and 70 can be distributed, thus increasing the durability of the seat rail.

In a detailed description, the load transmitted through the upper track 20 is force acting in a vertical direction. Most of the force is exerted on the roller members 60 and 70. However, according to the present invention, the ball bearing 40 is installed in the left bearing seat 31 to have contact points P2 and P3 in an inclination direction, and the ball bearing 50 is installed in the right bearing seat 33 to have contact points P5 and P6 in the inclination direction, so that the load transmitted through the upper track 20 is distributed and supported by the ball bearings 40 and 50 as well as by the roller members 60 and 70. Thereby, the load concentrated on the roller members 60 and 70 is distributed, so that overall durability is increased.

Further, the seat rail 1 according to the present invention is strong enough to support bending moment of the upper track 20, which occurs during a head-on collision or a rear-end collision, thus maximizing the safety of passengers.

That is, when a head-on collision or a rear-end collision occurs, the upper track 20 tends to move forward relative to the vehicle body due to inertial force. However, since the motion of the upper track 20 is limited by the lock unit, as shown in FIG. 1, the rear portion of the upper track 20 is lifted up towards the front portion of the vehicle body and is bent. Thereby, the upper track 20 has bending moment.

However, since the ends of the inner panel 21 and the outer panel 23, defining the left and right bearing seats 31 and 33, contact the ball bearings 40 and 50, sufficient support force is generated. Hence, the bending moment is offset, thus preventing the rear portion of the upper track 20 from being lifted up toward the front portion of the vehicle body. As a result, injuries to passengers caused by the seat rail 1 can be prevented.

As described above, the present invention provides a seat rail for vehicles, which eliminates gaps between a lower track and an upper track in horizontal and vertical directions, and distributes a load transmitted through the upper track, thus improving overall durability, and reduces the number of parts required, thus reducing the cost of a product and the working hours, realizing a light product, reducing fuel consumption, improving operational performance, reducing operational noise, improving operating sensation, and securing strength sufficient to support bending moment of the upper track, which is a concern during a head-on collision or a rear-end collision, therefore maximizing the safety of passengers.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A seat rail for vehicles, comprising:

a lower track mounted to a floor panel in a longitudinal direction of a vehicle body, both ends of the lower track being bent in such a way as to have a bilaterally symmetrical structure, thus defining a rail groove in the lower track, the bilaterally symmetrical structure defining a first upwardly extending portion and a second downwardly extending portion interconnected by a bent portion at each of left and right sides of the bilaterally symmetrical structure, the first upwardly extending portion defining an first arcuate seat portion;

an upper track comprising an assembly of an inner panel with an outer panel, overlapping first ends of the inner and outer panels being coupled to a seat cushion frame, and second ends of the inner and outer panels being bifurcated from each other and bent to be fitted into both ends of the rail groove, the outermost end portions of the second ends each defining a second arcuate seat portion;

a left bearing seat defined by the first and second arcuate seat portions of the lower and upper tracks, the first and second arcuate seat portions having symmetrical arcs;

a right bearing seat defined by the first and second arcuate seat portions of the lower and upper tracks, the first and second arcuate seat portions having symmetrical arcs;

a plurality of ball bearings seated in the left and right bearing seats, and installed such that each ball bearing is in point contact with the lower and upper tracks at only two point contact locations, the two point contact locations including a first point contact location on the first arcuate seat portion and a second point contact location on the second arcuate seat portion, the second end of the outer panel and the second end of the inner panel positioned between a left ball bearing and a right ball bearing in the width direction; and a plurality of roller members interposed between a bottom of the lower track defining the rail groove and a bottom of the inner panel facing the bottom of the lower track, and between the bottom of the lower track and a bottom of the outer panel facing the bottom of the lower track, and coming into point contact with the bottoms.

2. The seat rail as set forth in claim 1, wherein, when a point where a horizontal line passing through a center of gravity of the ball bearing seated in the left bearing seat meets the lower track is set as a reference point, the ball bearing is seated in the left bearing seat such that the first point contact location is 45° clockwise from the reference point, and the second point contact location is 225° clockwise from the reference point.

3. The seat rail as set forth in claim 1, wherein, when a point where a horizontal line passing through a center of gravity of the ball bearing seated in the right bearing seat meets the lower track is set as a reference point, the ball bearing is seated in the right bearing seat such that the first point contact location is 45° counterclockwise from the reference point, and the second point contact location is 225° counterclockwise from the reference point.

4. The seat rail as set forth in claim 1, wherein each of the roller members is shaped such that both ends thereof have the same diameter, and such that a diameter is gradually increased in directions from the both ends to a central portion, so that the central portion of one of the roller members is installed to be in point contact with the bottom of the lower track and the bottom of the inner panel, and the central portion of the other roller member is installed to be in point contact with the bottom of the lower track and the bottom of the outer panel.

* * * * *